(12) United States Patent
Yu et al.

(10) Patent No.: US 10,649,808 B2
(45) Date of Patent: May 12, 2020

(54) OUTCOME-BASED JOB RESCHEDULING IN SOFTWARE CONFIGURATION AUTOMATION

(71) Applicant: Oracle International Corporation, Redwood Shores, CA (US)

(72) Inventors: Shengming Yu, Redwood Shores, CA (US); Santosh Poonen, Redwood Shores, CA (US); Qiang Zhang, Redwood Shores, CA (US); Chenghao Shi, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 131 days.

(21) Appl. No.: 15/445,566

(22) Filed: Feb. 28, 2017

(65) Prior Publication Data

US 2018/0081716 A1    Mar. 22, 2018

Related U.S. Application Data

(60) Provisional application No. 62/396,004, filed on Sep. 16, 2016.

(51) Int. Cl.
| | | |
|---|---|---|
| *G06F 9/46* | (2006.01) |
| *G06F 9/48* | (2006.01) |
| *G06F 9/50* | (2006.01) |
| *H04L 12/24* | (2006.01) |
| *G06F 16/901* | (2019.01) |
| *H04L 12/26* | (2006.01) |

(52) U.S. Cl.
CPC .......... *G06F 9/4881* (2013.01); *G06F 9/5033* (2013.01); *G06F 9/5083* (2013.01); *G06F 16/9017* (2019.01); *H04L 41/0873* (2013.01); *H04L 41/12* (2013.01); *H04L 41/0672* (2013.01); *H04L 41/0816* (2013.01); *H04L 43/0817* (2013.01); *H04L 43/16* (2013.01)

(58) Field of Classification Search
CPC .................................................... G06F 9/4881
USPC ....................................................... 718/102
See application file for complete search history.

(56) References Cited

U.S. PATENT DOCUMENTS

| | | | | |
|---|---|---|---|---|
| 9,298,713 | B2 * | 3/2016 | Wang | G06F 8/60 |
| 2006/0241995 | A1 * | 10/2006 | McGlinchey | G06F 9/451 |
| | | | | 715/853 |
| 2006/0242586 | A1 * | 10/2006 | McGlinchey | G06F 17/30873 |
| | | | | 715/747 |
| 2009/0222483 | A1 * | 9/2009 | Johnson | G06F 8/60 |
| 2009/0222484 | A1 * | 9/2009 | Nordhielm | G06Q 10/06 |
| 2010/0262975 | A1 * | 10/2010 | Reysa | G06F 9/5077 |
| | | | | 718/105 |

(Continued)

*Primary Examiner* — Mehran Kamran
(74) *Attorney, Agent, or Firm* — Miller Nash Graham & Dunn LLP

(57) ABSTRACT

A distributed topology system may include a distributed topology engine configured to run on a server device and define a topology consisting of one or more building blocks. Each building block may represent one or more tasks pertaining to an application. The system may also include a distributed topology application configured to run on a client device and automatically execute one or more of the building blocks. A distributed topology database may be used to store the topology. A job rescheduling module may be configured to rerun at least one task responsive to at least one criteria being met.

18 Claims, 12 Drawing Sheets

(56) References Cited

U.S. PATENT DOCUMENTS

| | | | |
|---|---|---|---|
| 2011/0239011 A1* | 9/2011 | Waris | H04W 4/38 |
| | | | 713/310 |
| 2014/0044259 A1* | 2/2014 | Funayama | G06F 21/602 |
| | | | 380/243 |
| 2015/0163289 A1* | 6/2015 | Paul | H04L 67/02 |
| | | | 709/201 |
| 2016/0041840 A1* | 2/2016 | Daouk | G06F 17/30876 |
| | | | 718/108 |
| 2016/0345791 A1* | 12/2016 | Britain | A47L 9/2805 |
| 2018/0004634 A1* | 1/2018 | Brown | G06F 11/3676 |
| 2018/0004638 A1* | 1/2018 | Brown | G06F 11/3668 |
| 2018/0039548 A1* | 2/2018 | Bryant | G06F 11/1451 |

\* cited by examiner

200

Select Import Parameter

Select Block

Select Block Export Param.

| Show all Export Parameters | Reset above selection | Select | |
|---|---|---|---|
| Import Parameter | | Value | Description |
| PLATFORM | | %PLATFORM% | The value should be %PL |
| HOSTAME | | %HOST% | The name of the host on |
| SHIPHOME | | %SHIPHOME_RDBMS_11.2.0.1.0% | The shiphome location for |
| ORACLE_HOME | | %OH% | The ORACLE_HOME locat |
| ORACLE_HOME_NAME | | %OHN% | The ORACLE_HOME_NA |
| INVENTORY_LOC | | %INVLOC% | The inventory location us |
| ORACLE_SID | | %SID% | The Database SID for this |
| GLOBAL_DB_NAME | | %GDBNAME% | The Global Drtabase Nam |
| INSTALL_TYPE | | EE | Valid install types are : EE |
| DB_CHARSET | | AL32UTF8 | The database charater s |
| DB_PORT | | %DB_PORT% | The database listener po |
| SYS_PASSWORD | | welcome1 | The common password to |
| SOFTWARE_ONLY | | true | Whether the install lays o |

| COLUMN_NAME | DATA_TYPE | NULLABLE | DATA_DEFAULT | COLUMN_ID | COMMENTS |
|---|---|---|---|---|---|
| 1 JOBREQID | NUMBER(38,0) | No | (null) | 1 | (null) |
| 2 TOPO_ID | NUMBER(38,0) | No | (null) | 2 | (null) |
| 3 REQDATE | DATE | Yes | (null) | 3 | (null) |
| 4 NUMMACHINE | NUMBER(2,0) | Yes | (null) | 4 | (null) |
| 5 MAXDURATION | NUMBER(3,0) | Yes | (null) | 5 | (null) |
| 6 STANDALONE | CHAR(1 BYTE) | Yes | (null) | 6 | (null) |
| 7 ADELABEL | VARCHAR2(120 BYTE) | Yes | (null) | 7 | (null) |
| 8 SHIPHOME | VARCHAR2(256 BYTE) | Yes | (null) | 8 | (null) |
| 9 OS | VARCHAR2(12 BYTE) | Yes | (null) | 9 | (null) |
| 10 OS_FLAVOR | VARCHAR2(120 BYTE) | Yes | (null) | 10 | (null) |
| 11 STATUS | NUMBER(2,0) | Yes | (null) | 11 | (null) |
| 12 MACHINESASSIGNED | VARCHAR2(1024 BYTE) | Yes | (null) | 12 | (null) |
| 13 VIEWNAME | VARCHAR2(128 BYTE) | Yes | (null) | 13 | (null) |
| 14 SUBMITTER | VARCHAR2(48 BYTE) | Yes | (null) | 14 | (null) |
| 15 EMAIL | VARCHAR2(512 BYTE) | Yes | (null) | 15 | (null) |
| 16 STARTTIME | DATE | Yes | (null) | 16 | (null) |
| 17 ENDTIME | DATE | Yes | (null) | 17 | (null) |
| 18 EXPECTEDSUC | NUMBER(5,0) | Yes | (null) | 18 | (null) |
| 19 NUMSUC | NUMBER(5,0) | Yes | (null) | 19 | (null) |
| 20 NUMDIF | NUMBER(5,0) | Yes | (null) | 20 | (null) |
| 21 RESULTURL | VARCHAR2(256 BYTE) | Yes | (null) | 21 | (null) |
| 22 RELEASE | VARCHAR2(20 BYTE) | Yes | (null) | 22 | (null) |
| 23 PRODUCT | VARCHAR2(20 BYTE) | Yes | (null) | 23 | (null) |
| 24 JOBNAME | VARCHAR2(128 BYTE) | Yes | (null) | 24 | (null) |
| 25 TIMEOUTLIMIT | NUMBER(3,0) | Yes | (null) | 25 | (null) |
| 26 DTEVERSION | VARCHAR2(10 BYTE) | Yes | (null) | 26 | (null) |
| 27 HOURSAFTER | NUMBER(3,0) | Yes | (null) | 27 | (null) |
| 28 FARMSUBMITID | NUMBER(10,0) | Yes | (null) | 28 | (null) |
| 29 INTGFLAG | NUMBER(2,0) | Yes | (null) | 29 | (null) |
| 30 JOB_PARAMETERS | VARCHAR2(4000 BYTE) | Yes | (null) | 30 | (null) |
| 31 JOBALIAS | VARCHAR2(128 BYTE) | Yes | (null) | 31 | (null) |
| 32 RESULTARCHIVE | VARCHAR2(256 BYTE) | Yes | (null) | 32 | (null) |
| 33 RESULTARCHIVEURL | VARCHAR2(256 BYTE) | Yes | (null) | 33 | (null) |
| 34 SUBMITPROXY | VARCHAR2(20 BYTE) | Yes | (null) | 34 | (null) |
| 35 SUBMITPROXYPARAMS | VARCHAR2(1024 BYTE) | Yes | (null) | 35 | (null) |
| 36 AUX_OS | VARCHAR2(20 BYTE) | Yes | (null) | 36 | (null) |
| 37 AUX_OS_FLAVOR | VARCHAR2(20 BYTE) | Yes | (null) | 37 | (null) |
| 38 AUX_NUMMACHINE | NUMBER(2,0) | Yes | (null) | 38 | (null) |
| 39 JOBPARAMETERS | CLOB | Yes | (null) | 39 | (null) |

| COLUMN_NAME | DATA_TYPE | NULLABLE | DATA_DEFAULT | COLUMN_ID | COMMENTS |
|---|---|---|---|---|---|
| 1 UNIQUE_KEY | NUMBER | No | (null) | 1 | (null) |
| 2 JOBREQID | NUMBER | No | (null) | 2 | (null) |
| 3 RESUBMIT_JOBREQID | NUMBER | No | (null) | 3 | (null) |
| 4 FARMID | NUMBER | Yes | (null) | 4 | (null) |
| 5 RESUBMIT_FARMID | NUMBER | Yes | (null) | 5 | (null) |
| 6 CRITERIA | VARCHAR2(1024 BYTE) | Yes | (null) | 6 | (null) |

| UNIQUE_KEY | JOBREQID | RESUBMIT_JOBREQID | FARMID | RESUBMIT_FARMID | CRITERIA |
|---|---|---|---|---|---|
| 1 | 2212602598S | 2602625619723608 | 14723840 | reSubmitcriteria=difnumgt0 |

900

OUTCOME-BASED JOB RESCHEDULING IN SOFTWARE CONFIGURATION AUTOMATION

CROSS REFERENCE TO RELATED APPLICATIONS

This application claims priority to and the benefit of U.S. Provisional Patent Application No. 62/396,004, titled "OUTCOME-BASED JOB RESCHEDULING IN SOFTWARE CONFIGURATION AUTOMATION" and filed on Sep. 16, 2016, which is hereby incorporated herein in its entirety.

BACKGROUND

In today's software research and development organizations, an incredible amount of time and resources is typically required in setting up a working environment, which typically includes multiple machines and devices that are networked together and configured to run various software applications and suites that span across the machines and possibly other devices. A proper setup of a working environment typically requires the individual configuration of numerous software components that together form a complex interdependent network of machinery and software installations, but there are various problems associated with setting up these environments. For example, users typically need to learn how to configure each software component in the technology stack but most of those installs may actually be outside their areas of expertise.

The existence of numerous input values and pre-configuration requirements for underlying installations increases the possibility of typographic or misconfiguration errors by a user. Even if the user was somewhat familiar with how to configure the underlying software, a simple user input or configuration error at some point along the way might manifest itself only much later in the technology stack, thereby resulting in a potentially tremendous waste of time.

Human limitations often force some processes to be linear even though some of them might be able to be parallelized with automated software to increase efficiency. Even if the environment can be distributed so that various independent tasks can be executed simultaneously across different machines, though, the user is typically limited to being able to only perform one configuration task at a time.

The manual configuration of specialized environments is usually dependent on individuals who have specific knowledge about those configurations. Should the user be unavailable at any point during the process, all of the knowledge acquired by that user with regard to the setup of the environment would automatically become unavailable. In most cases, users do not want to set up a configuration on their own personal machines but on some other machine of their choosing. However, current frameworks do not allow for remote machines to be used for the execution nor do they provide active communication with these remote machines. Thus, users are typically required to constantly monitor the execution of the associated topology, which provides the pertinent configuration specifications, in setting up the environment.

Current frameworks do not allow for proper exiting from all relevant tasks, let alone reporting of the success or failure of those tasks. Users often desire to trigger a run of their topologies without human intervention so that results are available upon their return, but current frameworks do not allow for scheduling of the execution of topologies at any given time. Also, current frameworks do not allow for a predefined selection of topologies to be executed simultaneously based on the user's selection, nor do they effectively indicate whether the set up of a particular software configuration has been validated and certified.

Accordingly, there remains a need for a way to address these and other deficiencies associated with the prior art.

BRIEF DESCRIPTION OF THE DRAWINGS

FIG. 2 illustrates an example of a building block interface in accordance with certain implementations of the disclosed technology.

FIG. 7 illustrates an example of a DTE Job Table in accordance with implementations of the disclosed technology.

FIG. 9 illustrates a second example of a DTE job table entry.

DETAILED DESCRIPTION

As used herein, a topology generally refers to a set of configuration specifications for a working environment. A topology may include, for example, a mapping of physical and/or logical connections between nodes, such as computers or other electronic machines or devices in the environment, and individual requirements or preferences for any or all of the individual nodes or other components of the environment. A topology may also include various settings and parameters for software programs and/or suites that are to be used on, within, or in connection with the environment.

A topology in accordance with the disclosed technology generally includes multiple building blocks or "mini programs," which generally represent programs that are designed to install and/or configure relatively small portions, sub-parts, or aspects of the environment, such as a database or certain portions or characteristics of the database. Execution of a topology generally refers to the setting up of the environment by executing each of the associated building blocks in accordance with the topology.

The disclosed technology generally pertains to a distributed topology environment (DTE) framework that may be used to provide users with the ability to automatically configure complex software programs. The disclosed DTE framework may provide a Software-as-a-Service (SaaS) solution that may be leveraged to enable companies or individual users to quickly create reproducible environments of complex software installations. Certain implementations of this automation framework incorporate multiple layers of cloud computing in delivering solutions as an integrated service to end users.

The DTE framework may also allow for debugging and quality assurance testing of such installations, providing companies and users with significant savings in time and resources, particularly with regard to development groups, quality assurance teams, and support staff members. Such realized improvements in development and quality assurance typically result in a streamlining of the code approval process because changes in code may be immediately verified in valid customer scenarios before being introduced into the pertinent product(s).

Embodiments of the DTE framework described herein generally conform to the model of cloud computing in providing a service for the automated configuration of software in a simple and easily understood way without requiring that its users have knowledge of how the service is provided. Whereas certain tasks have been previously automatable, such as certain installs and quality assurance test suites, for example, current systems do not provide complete automation of such tasks from start to finish without requiring some type of manual intervention between tasks. Implementations of the DTE framework, however, generally allow for full testing against valid customer-specific configurations.

Figure 1:
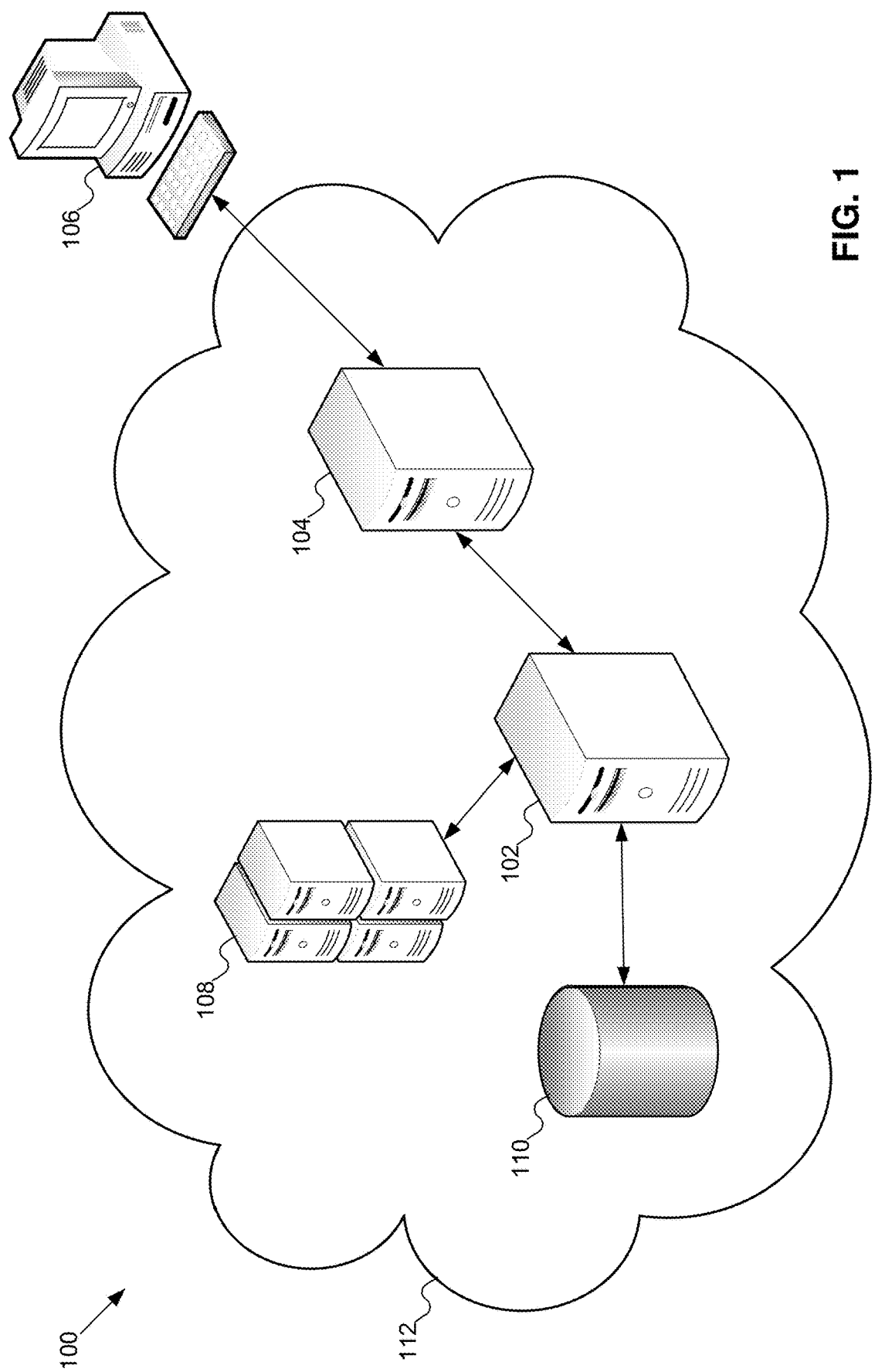
FIG. 1 illustrates an example of a networked system in which embodiments of the disclosed technology may be implemented.

FIG. 1 illustrates an example of a networked system 100 in which embodiments of the disclosed technology may be implemented. A DTE framework as illustrated in FIG. 1 may be effected by multiple applications spanning multiple devices, some or all of which may be referred to as being in the cloud. Such arrangements are generally referred to as cloud computing. In these scenarios, the DTE framework described herein may allow for automated installation and configuration of software products delivered to customers as a SaaS solution.

The system 100 includes a DTE engine 102 that may be implemented on or in connection with a single device such as a central server, for example. The DTE engine 102 may drive a DTE application 104 that may be implemented on or in connection with a webserver, for example. A client device 106, such as an individual user's computer, for example, may interact with the DTE engine 102 through the DTE application 104. In the example, the DTE engine 102 also interacts with, e.g., drives and/or receives information from, one or more execution machines 108.

The DTE engine 102 may interact with a data store 110 that may be implemented as a database on the same machine as the DTE engine 102 or on a separate machine that may be situated remotely from the machine on which the DTE engine 102 primarily resides. The data store 110 may be configured to store building blocks, topology specifications, topology libraries, or any combination thereof. In alternative embodiments, the DTE engine 102 may interact with several data stores that each pertain to different topologies, building blocks, etc.

Embodiments of the DTE framework described herein generally include a thin client-side application or suite of applications configured to communicate with a central server that primarily drives the DTE framework. When used in conjunction with a designated pool of machines, the DTE framework may provide an entire platform and infrastructure as a service. Such implementations may be deployed and scaled across virtually any operating system.

Embodiments of the DTE framework may allow users to create and save mini-programs configured to perform specific tasks based on provided input parameters. The DTE framework may then allow for these tasks to be integrated together into a topology by way of exchanging useful information among the various tasks. In this way a complex install environment can be configured accurately, effectively, and efficiently.

A user may create certain individual tasks or building blocks that may continue to be owned by the block creator but may also be utilized by any other user in connection with the DTE framework to set up different personalized configurations. A building block generally represents a relatively simple task in a computer work-flow process and may include a silent product install task, a silent product configuration task, a test driving task, a script execution task, or virtually any other type of task that may be performed in an automated manner.

Building blocks may be tailored for use with a particular product install process, for example. Building blocks may also be shared with others and, in some embodiments, may be certified for such reuse. A building block as described herein generally includes two components: a building block definition, e.g., an XML, definition, and building block logic, e.g., an executable script.

FIG. 2 illustrates an example of a building block interface 200 in accordance with certain implementations of the disclosed technology. The building block interface 200 may be implemented as a web-based application and may provide a graphical user interface (GUI) having multiple tabs such as "Create Building Block," "Edit Building Block," "Building Block Details," "Test Building Block," etc. The "Building Block Details" tab may result in the presentation of a building block details page from which a user may cause a script, such as a Perl script, to be generated on the browser to be saved locally, for example. The "Test Building Block" tab may result in the presenting of a test building block page from which the user may test the selected building block locally, e.g., before saving the building block or making it available to other users.

In the illustrated example, a number of import parameters associated with building block DATABASE1 are displayed along with their corresponding values and descriptions. The import parameters that may be specified for a particular building block may include, but are not limited to, the associated platform, a name of the host on which a database is to be installed, a name of the associated database, and a password, for example. Output parameters of a building block may include, but are not limited to, the execution outcome of a task, e.g., SUCCESS or FAILURE, the host name where the database was installed, and the database listener port number and/or service name (if successful).

A building block in accordance with the DTE framework described herein may be characterized at least in part by the following pseudo-code:

```
procedure read_importfile
    read input file containing user-specific parameter values
procedure read_runtimefile
    read text file containing environment-specific parameter values
procedure execute_task
    perform task (install, test, etc.)
procedure write_exportfile
    write output file containing install-specific information
```

Consider an example in which experts of a particular software application or suite may create one or more building blocks specifically tailored for their software. Other users, who may not have similar expertise with this the software, can safely use the pre-made building blocks without having to learn the details of the specific software configuration. For example, a database install expert may create a particular database install block (e.g., DATABASE1 of FIG. 2) that uses a certain installer to automatically configure the database. A script may be used to populate a response file for the install by instantiating relevant values that the user has provided to the building block(s) and, in the case of unspecified parameters during the install, selecting or determining default values for the unspecified parameters.

Upon completion of a certain task during install, information generated by the task itself may be made available to other building blocks in the DTE framework that might benefit from or need such information. In this way, a user who needs the particular database install in his or her environment but is not familiar with the details of the specific configuration may simply use the predefined DATABASE1 install block in the new topology.

DTE framework building blocks may each read input parameters from text files that are generated by the framework based on how that particular building block is defined in the framework. As noted above, a building block may populate a file containing values that other building blocks in the topology may need upon completion of the associated task. Since these values may be saved into files for repeated usage by building blocks the possibility of typographical errors in the input values may be drastically reduced, if not eliminated entirely.

In certain embodiments, two or more building blocks may be arranged together into one or more particular topologies according to the specifications of the environment. These topologies, while typically owned by the creator, may be utilized by virtually any other user in the DTE framework. The topologies can execute independent tasks simultaneously across various machines. That is, the DTE framework may spawn a process to execute a first task and, if a second task is not dependent on the first, the DTE framework may spawn a process to execute the second task simultaneously. These tasks may be on the same hardware resource or on different hardware resources, resulting in significant execution time savings during the set up of the desired configuration.

Figure 3:
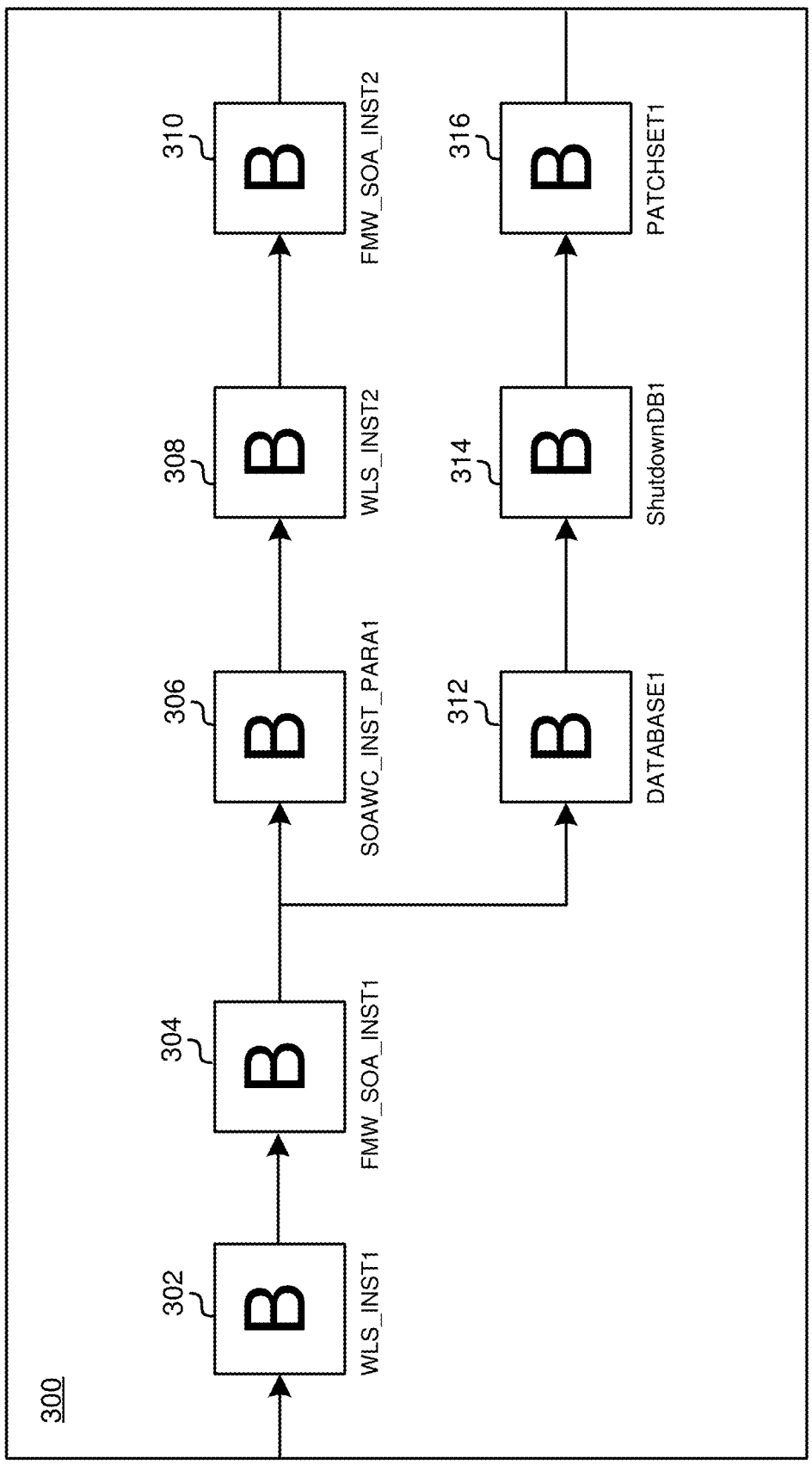
FIG. 3 illustrates an example of a topology creator interface in accordance with certain implementations of the disclosed technology.

FIG. 3 illustrates an example of a topology creator interface 300 in accordance with certain implementations of the disclosed technology. In the example, a number of building blocks 302-316 have been selected as part of the topology being created. The building blocks may be arranged in virtually any order and combination, depending on the desired resulting configuration upon execution of the topology. One of the building blocks (312) in the example is the building block DATABASE1 of FIG. 2. Once the topology creator is satisfied with the topology, he or she may save the topology. The topology may be saved locally, at remote storage (such as a central server or database), or both.

The illustrated example indicates that, when the topology is executed, building block 302 is to be executed before any of the other building blocks 304-316. Once the second building block 304 has executed, however, parallel execution may begin in accordance with a branching structure of the topology. More specifically, building blocks 306 and 312 may be executed concurrently. Building blocks subsequent to 306 and 312, e.g., 308-310 and 314-316, respectively, may be executed concurrently or dependent upon other factors as specified by the topology creator.

In certain embodiments, the DTE framework may allow creators or administrators to define certified topologies. Certified topologies generally refer to topologies that have been validated and certified for use in connection with the specific configurations that they are primarily intended to address. Certified topologies may be released to customers along with corresponding software, for example. In such scenarios, a certified topology may be enable the customer to install and configure the product in an automated and efficient manner with a significant reduction in—or even complete elimination of—errors that might otherwise be manifested during an installation in accordance with current procedures.

With regard to the topology shown in the interface 300 of FIG. 3, for example, the creator may desire to make the topology available to others for future implementations and may do so by testing and validating the topology. Upon successful testing and/or validation, the creator may designate the topology as certified. In certain embodiments, another user such as an administrator must approve of the certification before allowing other users to be notified of the certified status of the topology.

In certain embodiments, a user may create a topology manually by way of creating an XML file and then importing the XML, file using the topology creator interface 300, for example. Alternatively or in addition thereto, a user may export an XML file of a topology using the topology creator interface 300, edit the XML file manually, and then import the modified XML file by way of the interface 300, for example.

Once a topology is saved within the DTE framework, it is generally owned by its creator and, unless another user has been granted administrative privileges on the topology, only the creator may modify the topology. However, the topology may be made available for use by any registered DTE user. In situations where a certain user likes a particular topology but wants to customize it further, the user may clone the topology. The resulting cloned topology will thus be owned by the user who performed the cloning and can then be modified as needed by the user.

Figure 4:
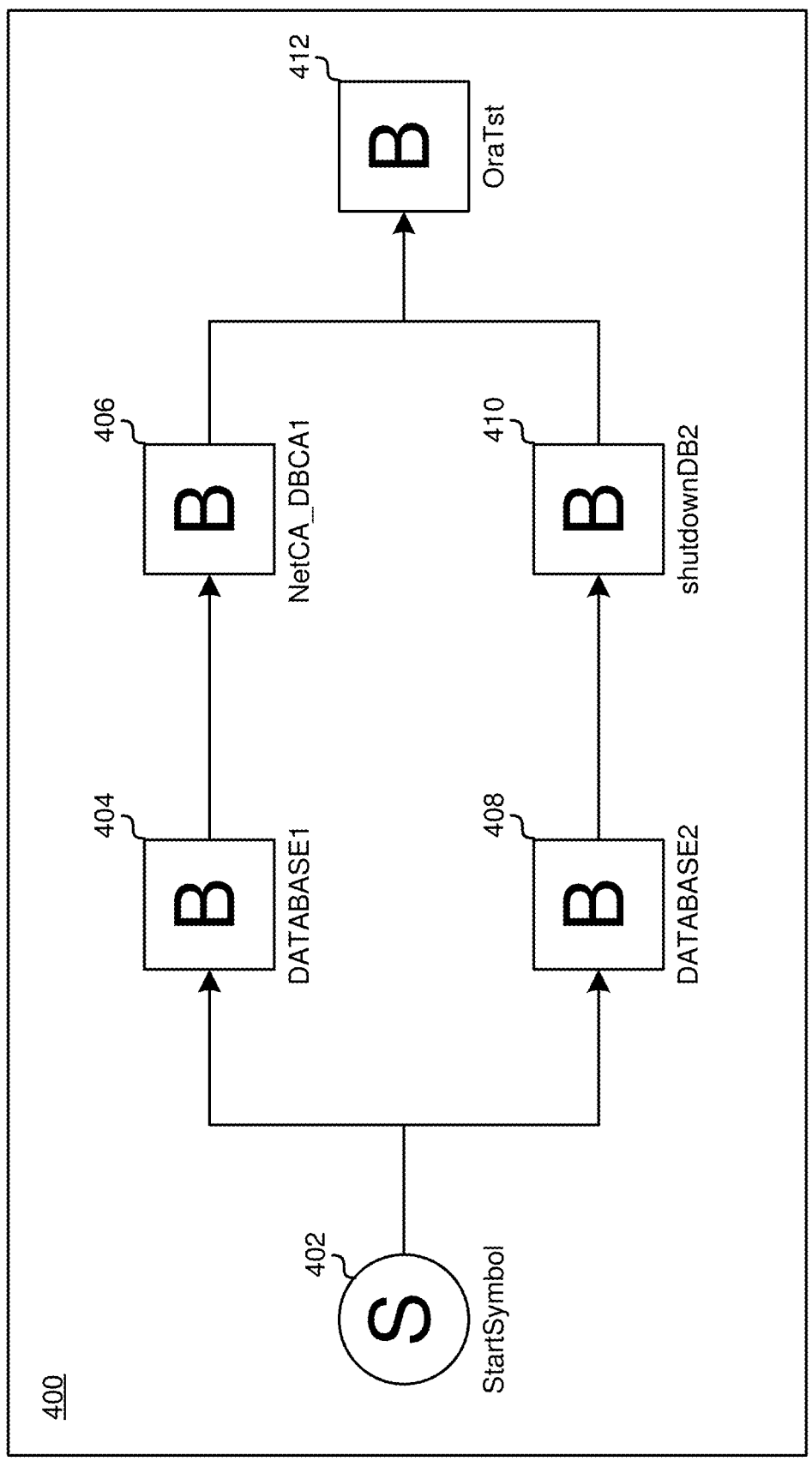
FIG. 4 illustrates an example of a topology editor interface in accordance with certain implementations of the disclosed technology.

FIG. 4 illustrates an example of a topology editor interface 400 in accordance with certain implementations of the disclosed technology. In the example, the topology editor interface 400 is presenting a topology that includes a starting module 402 and multiple building blocks 404-412, one of which (404) represents the DATABASE1 building block in the examples illustrated by FIGS. 2 and 3 and described above.

The topology editor interface 400 may present a number of features and options to the user. For example, the user may rearrange any or all of the building blocks 404-412. The user may also delete and/or clone any of the building blocks 404-412. For example, a DATABASE2 building block (408) may be a cloned version of the DATABASE1 building block (404) with (or without) modification. In certain embodiments, the user may import and/or export certain XML files to be used in connection with any of the building blocks 404-412.

In certain embodiments, a topology editor interface may offer the user with a standard look and feel while provide graphical representations of complex concepts such as inheritance of topologies. A topology editor may interact with a strong data structure that allows in-memory operations but is flexible enough to handle new requirements. The topology editor may also be adaptable for certain enhancements such as partial execution of topology.

In certain embodiments, the DTE framework may include a lightweight proxy listener written using the Perl interpreter, for example. If this listener is started on any associated machine, the DTE framework may communicate with the listener and perform the execution of a topology on that machine, regardless of how remote the machine may be.

The DTE framework may include a reporting mechanism for a topology. The reporting mechanism may consist of the status for each individual building block within the topology. For example, a certain database install block may have a routine that analyzes the install log generated by a certain install to determine whether the install succeeded or failed. The subsequent generation of a file with a particular extension (e.g., .suc or .dif) may be used to indicate in the report whether that particular task succeeded or failed.

A DTE engine may be used to execute topologies and create reports of executed tasks, for example. The DTE engine may be used to set up a topology in a distributed environment involving multiple systems that may involve multiple operating systems. The DTE engine may effectively act as a central console process though it does not need to be situated at or on any of the involved systems.

In certain embodiments, the DTE engine is programmed in Java. The DTE engine may also communicate with remote machines in implementations that include a DTE proxy listener, for example. In these embodiments, the DTE engine may communicate with the remote machine(s) over a TCP/IP network to perform the entire execution of a selected topology remotely, for example.

The DTE engine, which is also referred to as a DTE execution handler, in accordance with the DTE framework described herein may read and parse a topology definition file for a specific topology, ping the participating system(s) of the distributed environment and check the validity thereof, look for and analyze any building block dependencies in the topology definition, and process the building blocks in accordance with the execution order specified by the topology. The DTE engine may be characterized at least in part by the following pseudo-code:

```
procedure TopologyProcessor (topology)
    retrieve topology information
    organize building blocks in order based on dependencies specified
      in topology
    call Local TaskProcess for each block successively in order
procedure LocalTaskProcess (machine, block)
    execute a single block on the specified machine
procedure CreateHTMLReport (machine, block)
    summarize executed job based on sucs/difs
    write output to HTML file
procedure Proxy (machine, port)
    start a listener on the specified machine using the provided port
    return status of the listener
```

An entire topology (or set of multiple topologies) may be executed on a single machine. In these embodiments, the building blocks of each topology are generally executed in the sequence specified by the topology.

In certain embodiments, the DTE framework may allow users to define sets of topologies, which will be referred to herein as toposets. When used in connection with a pool of machines, the topologies of a given toposet may all be executed simultaneously across different hardware resources. In these embodiments, which will typically include complex topologies and/or multiple topologies, building blocks of one or more of the topologies may be executed across multiple hosts, e.g., on different devices. Also, different building blocks of one or more of the topologies may be executed in parallel, subject to any dependencies specified by the topology or limitations presented by the device(s) on which the building blocks are executed. Development and testing teams may use toposets to conveniently organize multiple topologies.

Certain implementations of the DTE framework include a DTE log analysis module that may be used to determine the status of a particular task. The following is an example of pseudo-code implementing a DTE log analysis module:

```
procedure analyze_task_log
    if "success" string found in log file
        if exceptions or errors found in log file
            create .dif file
            return status = ACCEPTABLE
        else
            create .suc file
            return status = SUCCESS
    else
        create .dif file
        return status = FAILURE
```

A summary of the status for multiple tasks may be formulated into a report, such as an HTML report, which may be based on any .dif or .suc files created during analysis. A results archive may be used to store any or all generated reports. In certain embodiments, only some reports, such as critical logs, for example, are stored. Also, logs pertaining to an entire environment may be stored in a compressed file.

In certain embodiments, the DTE framework described herein may include a scheduler that users may use to have one or more specified topologies executed at specified time(s) and location(s). For example, a user may specify that a certain topology is to be executed on a particular machine at a designated time or, if the machine is unavailable at the desired time, then it should be executed on an assigned secondary device.

Figure 5:
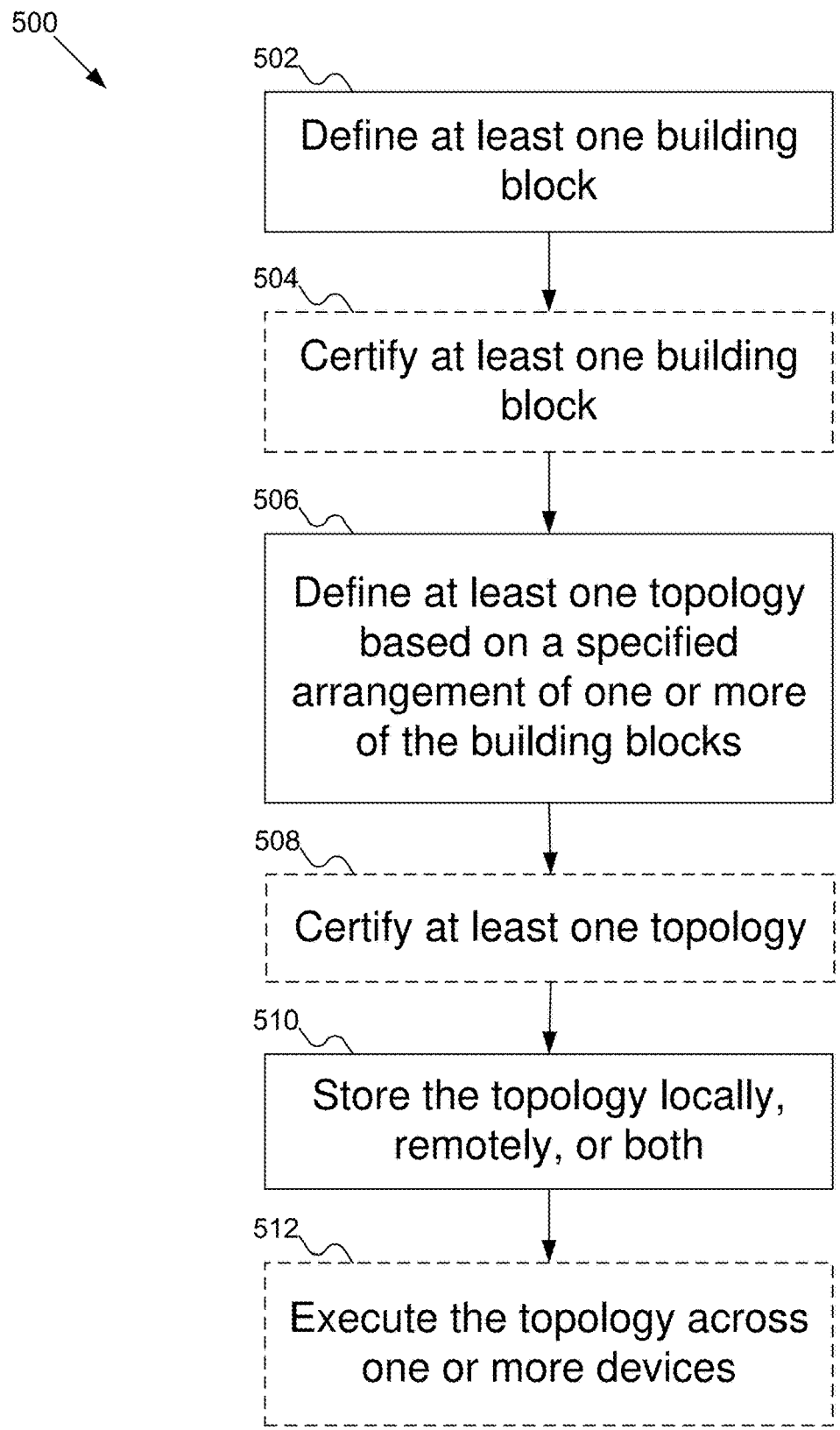
FIG. 5 illustrates an example of a method of managing building blocks and topologies in accordance with certain implementations of the disclosed technology.

FIG. 5 illustrates in example of a method 500 of managing building blocks and topologies in accordance with implementations of the disclosed technology. At 502, one or more building blocks are defined in accordance with any of the pertinent techniques described above. In an optional operation at 504, one or more building blocks may be certified. In certain embodiments, for example, a building block must be certified before it can be used in a topology or re-used by another user in another topology.

At 506, one or more topologies are defined in accordance with any of the corresponding techniques described above. For example, a user may use the topology creator interface 300 of FIG. 3 or the topology editor interface 400 of FIG. 4 to create a new topology or modify a previously-created topology. In an optional operation at 508, one or more topologies may be certified. In certain embodiments, for example, a topology must be certified before it can be executed or implemented in connection with other topologies, e.g., re-used by other users.

At 510, the one or more topologies may be stored locally, remotely, or both, e.g., in the data store 110 of FIG. 1. In an optional operation at 512, at least one topology is executed as directed by a user or scheduling mechanism, for example. A DTE engine, such as the engine 102 of FIG. 1, may execute the topology by executing each of the topology's building blocks in accordance with the specified sequence. The DTE engine may execute or cause to be executed the building blocks of the topology in sequence, in parallel, or both on the client machine 106, web server 104, and/or execution machines 108 of FIG. 1, for example.

Figure 6:
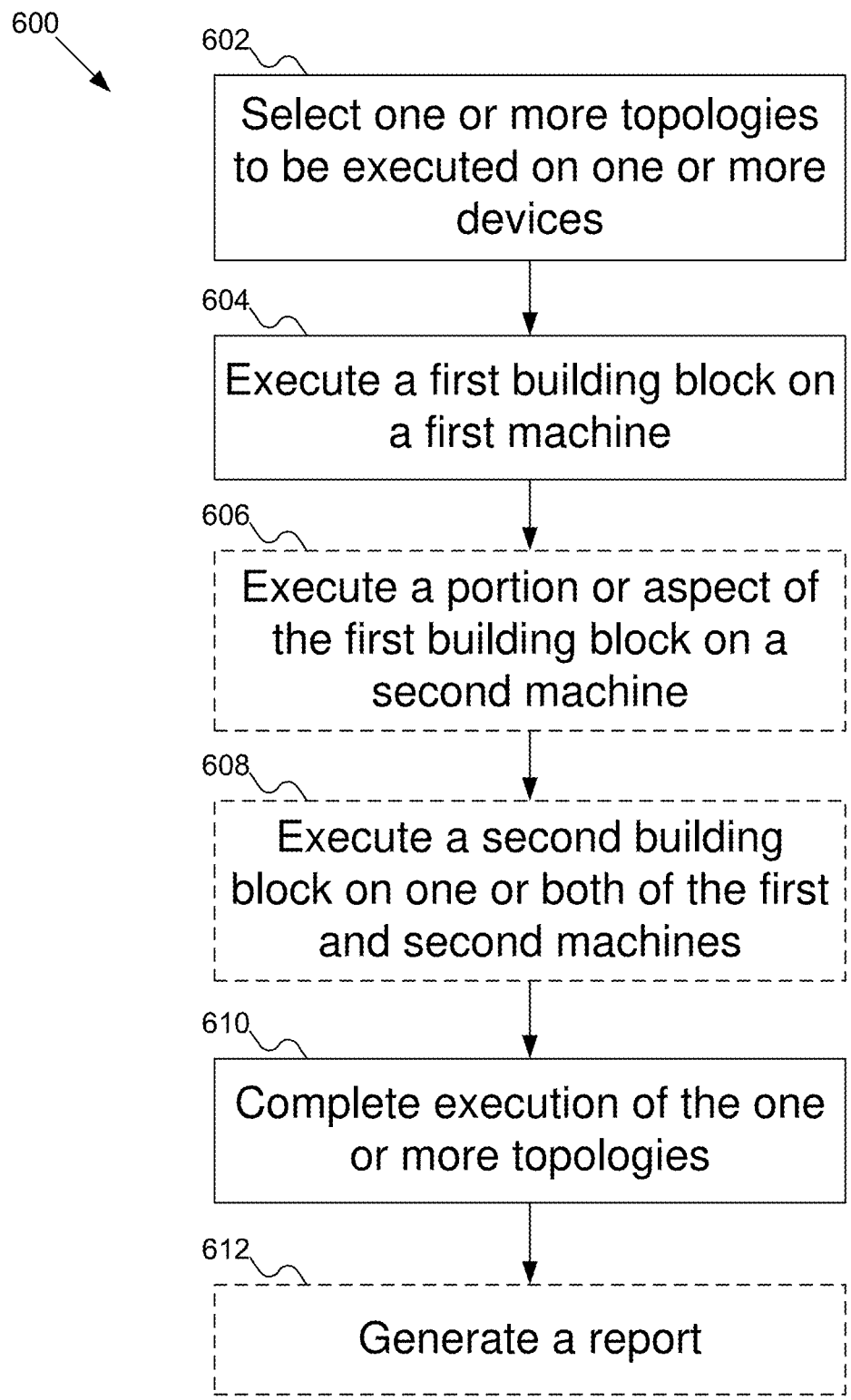
FIG. 6 illustrates an example of a method of executing a topology in accordance with certain implementations of the disclosed technology.

FIG. 6 illustrates an example of a method 600 of executing a topology in accordance with implementations of the disclosed technology. At 602, one or more topologies are selected for execution, e.g., by a user or scheduler. The one or more topologies are to be executed on one or more devices as specified by topology definitions, for example. At 604, a first building block is executed on a first device, e.g., machine.

In optional operations at 606 and 608, respectively, a sub-part of the first building block may be executed on a first machine and a second building block (or portion thereof) may be executed on one or both of the machines and/or on a third machine. The operations at 604-608 generally continue until the building blocks to be executed have either successfully completed or encountered an error or other reason for early termination.

At 610, the one or more topologies complete execution and, in an optional operation at 612, a report may be generated in accordance with the techniques described above. The report may be stored and/or sent to a particular destination, e.g., via email. In certain embodiments, the report may be generated during execution of one or more of the building blocks to be executed. In these embodiments, real-time status updates, including alerts and error messages, may be provided to the user and/or administrator. The generated report may be saved in a data store by itself or in connection with other reports and may be stored as a compressed file.

```
check all tasks' status;
    if 'completed':
        count all the suc and dif files;
        calculate percentage metrics;
        if dif number criteria match:
            invoke rerun API;
        else
            if dif number percentage criteria match:
                invoke rerun API;
            else
                if specified dif occurs:
                    invoke rerun API;
                else
                    return; (e.g., no rerun is necessary)
```

A DTE job's definition may be stored in a DTE database table by a DTE job submission module. The DTE's job runtime module may update the job's start time, end time, status, and suc and dif metrics throughout the job execution period. The DTE job table may include essential properties such as the requested hardware resource, job parameters, etc. Table 1 below illustrates various DTE Job Rerun Criteria Syntax[1]:

[1] As used herein, a "dif" file is indicative of a failure in pertinent test reporting frameworks and a "suc" file is indicative of a successful action.

| Condition | Criteria |
| --- | --- |
| Dif number is more than x | reSubmitCriteria=difnumgtx |
| Dif number is less than x | reSubmitCriteria=difnumltx |
| Dif number is more than x% | reSubmitCriteria=difpercentgtx |
| Dif number is less than x% | reSubmitCriteria=difpercentltx |
| Particular dif like start_wls.dif | reSubmitCriteria=start_wls |
| Exclude dif like db_instal.dif | reSubmitCriteria:ExcludedDifList=dbinstall |
| Multiple conditions | reSubmitCriteria=difnumgtx,difpercentgtx,start_wls, start_db, reSubmitCriteria:ExcludedDifList=dbinstall |

Certain implementations of the DTE framework may include an outcome-based job rescheduling system that advantageously provides users with the ability to rerun previously submitted jobs. Such a framework may be particularly beneficial in situations where a user would like to: rerun a job if a specific failure occurs; rerun a job if a "new" failure occurs, other than predefined known failures; rerun a job if the number of failures exceeds a certain threshold; rerun a job if the number of failures is within a certain threshold, since massive failures beyond that threshold would require manual triage rather than auto-resubmission; rerun a job if the percentage of failures out of the total number of test cases exceeds or is within a certain threshold; rerun a job to determine if the original failure is an intermittent issue. In each of these scenarios, a tracking defect would likely be raised to flag the cause of the original failure but the automatic resubmission would desirably keep the Continuous Integration model intact.

Figure 8:
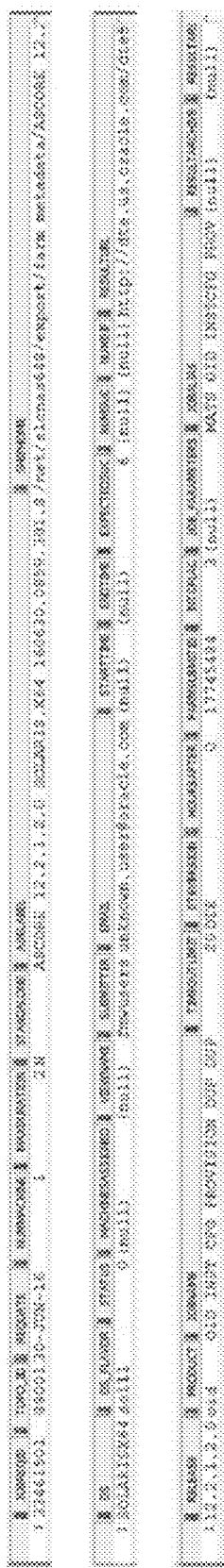
FIG. 8 illustrates a first example of a DTE job table entry.

In certain implementations where all of the tasks of a DTE job are complete, the DTE runtime engine may collect all of the suc files and dif files from the entire working directory and then, based on known statistics and by comparison with the criteria specified in the job submission command, the DTE runtime engine may invoke the re-run API correspondingly. The following is an abstract of the pseudocode for this implementation:

FIG. 7 illustrates an example of a DTE Job Table 700 in accordance with implementations of the disclosed technology. FIG. 8 illustrates an example of a DTE job table entry 800 that represents the entries for a DTE job of DTE Topology 89001 on a SOLARISX64-sol11 machine.

A DTE Job Rerun Cloud service may fetch all of the job parameters specified in the original job's submission command, remove specific rerun criteria parameters (e.g., to avoid getting into an infinite loop of reruns), and trigger a new DTE Job on new resources matching the hardware criteria, e.g., in order to reproduce the original run. The DTE Job Rerun Cloud service may also associate rerun jobs with the original job in the DTE database table in order to facilitate future comparison and parallel triage, for example.

FIG. 9 illustrates an example entry 900 that shows the association of rerun DTE job 26026256 with original DTE job 26025985, and the criteria which triggered the rerun action—viz., difnumgt0, meaning that the requestor wanted to rerun the original job if the number of difs was greater than 0.

The DTE Job Rerun Cloud service may also allow users to control the number of times a job should be rerun. For example, a user can set "rerun_count=2" so that when the rerun criteria is met, the DTE engine will attempt to rerun the job twice. In certain embodiments, the DTE Job Rerun Cloud service may record data for the original job and all of its rerun jobs, thus advantageously allowing users to easily compare jobs, triage failures, and identify intermittent failures. In certain embodiments, a Reporting UI may show which machines are used for original run and rerun jobs, timing statistics, and result location, for example.

Figure 10:
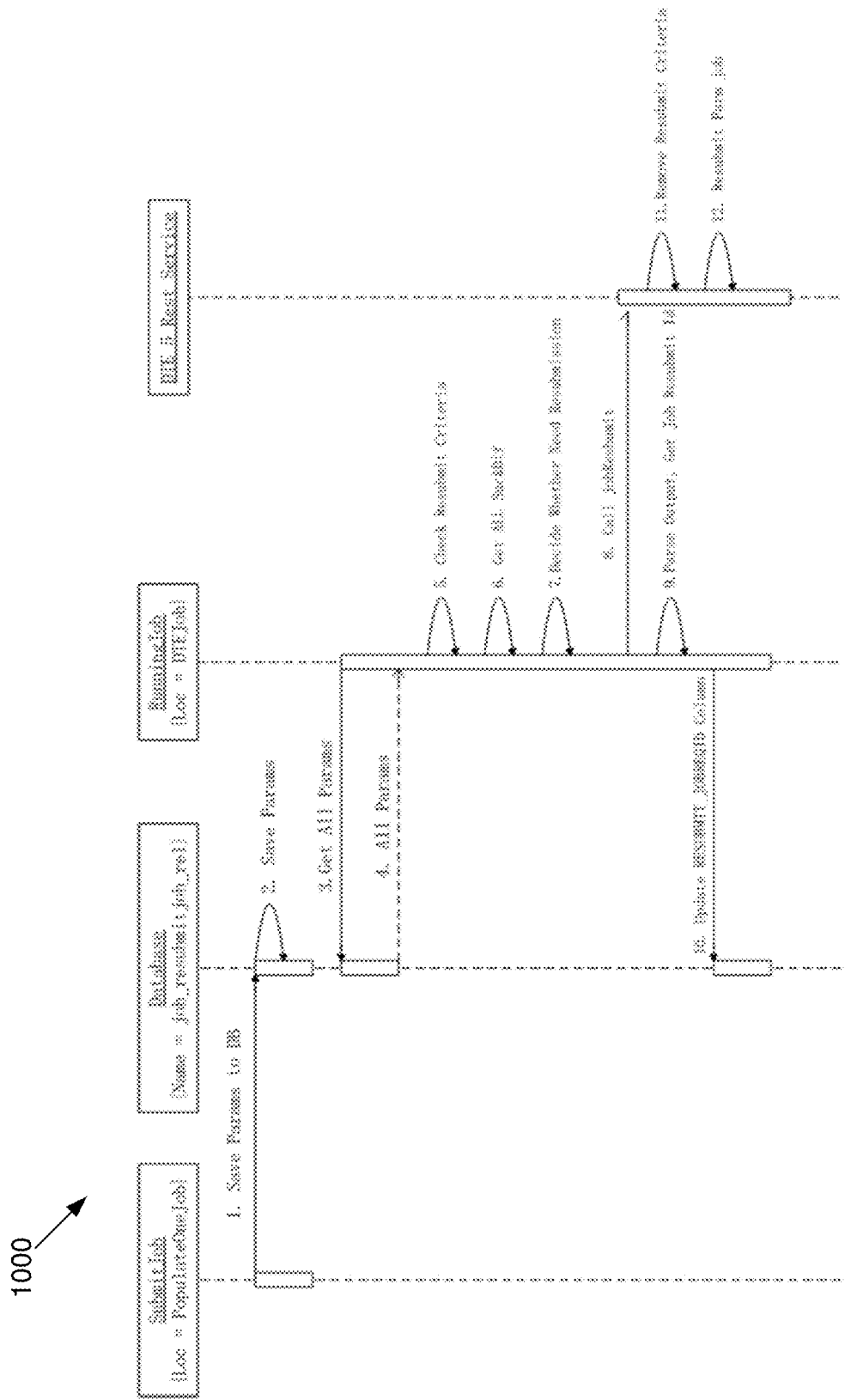
FIG. 10 illustrates an example of how the DTE Job Submission module can handle the job parameters' registration and resource assignment in accordance with certain implementations of the disclosed technology.

FIG. 10 illustrates an example 1000 of how the DTE Job Submission module can handle the job parameters' registration and resource assignment. The DTE Runtime module executes all the tasks of a DTE Job. Upon completion, it checks the rerun criteria specified in the job parameters stored in the DTE Database, and compares them with the actual runtime failure data, then makes the decision whether to invoke the DTE Job Rerun API based on the established criteria. If the conditions are met for rerun, it internally recovers the original Job's parameters, and invokes the DTE Job Submission module, correlating the original job and all the rerun jobs.

Figure 11:
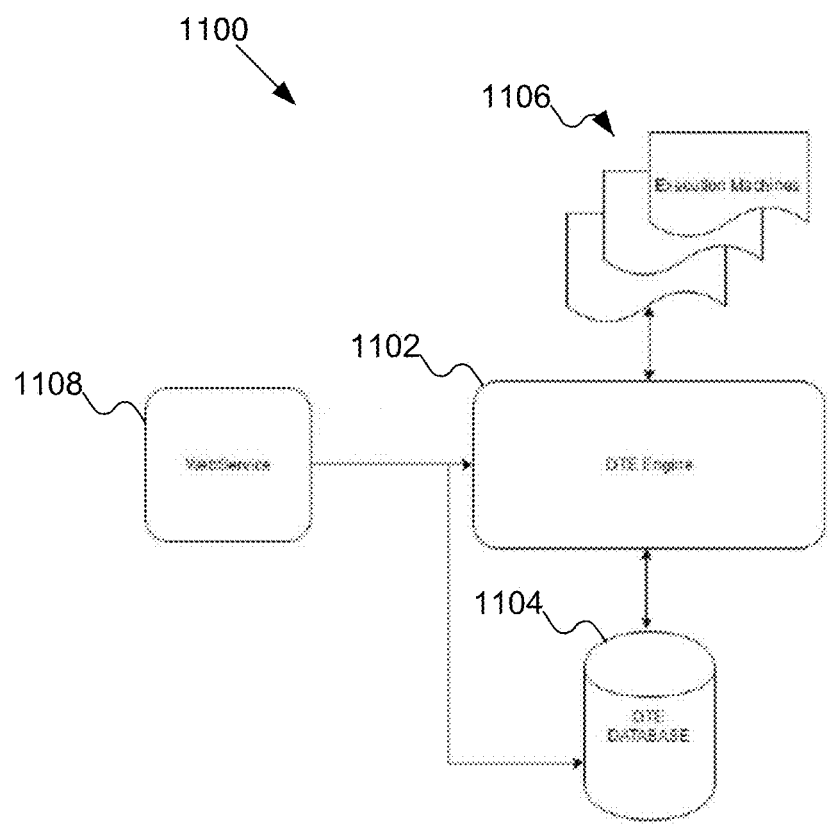
FIG. 11 illustrates an example of a DTE system in accordance with certain implementations of the disclosed technology.

FIG. 11 illustrates an example of a DTE system 1100 in accordance with certain implementations of the disclosed technology. In the example, the system 1100 includes a DTE engine 1102, a DTE database 1104, one or more execution machines 1106, and a Web Service 1108 configured to communicate with the DTE engine 1002.

Figure 12:
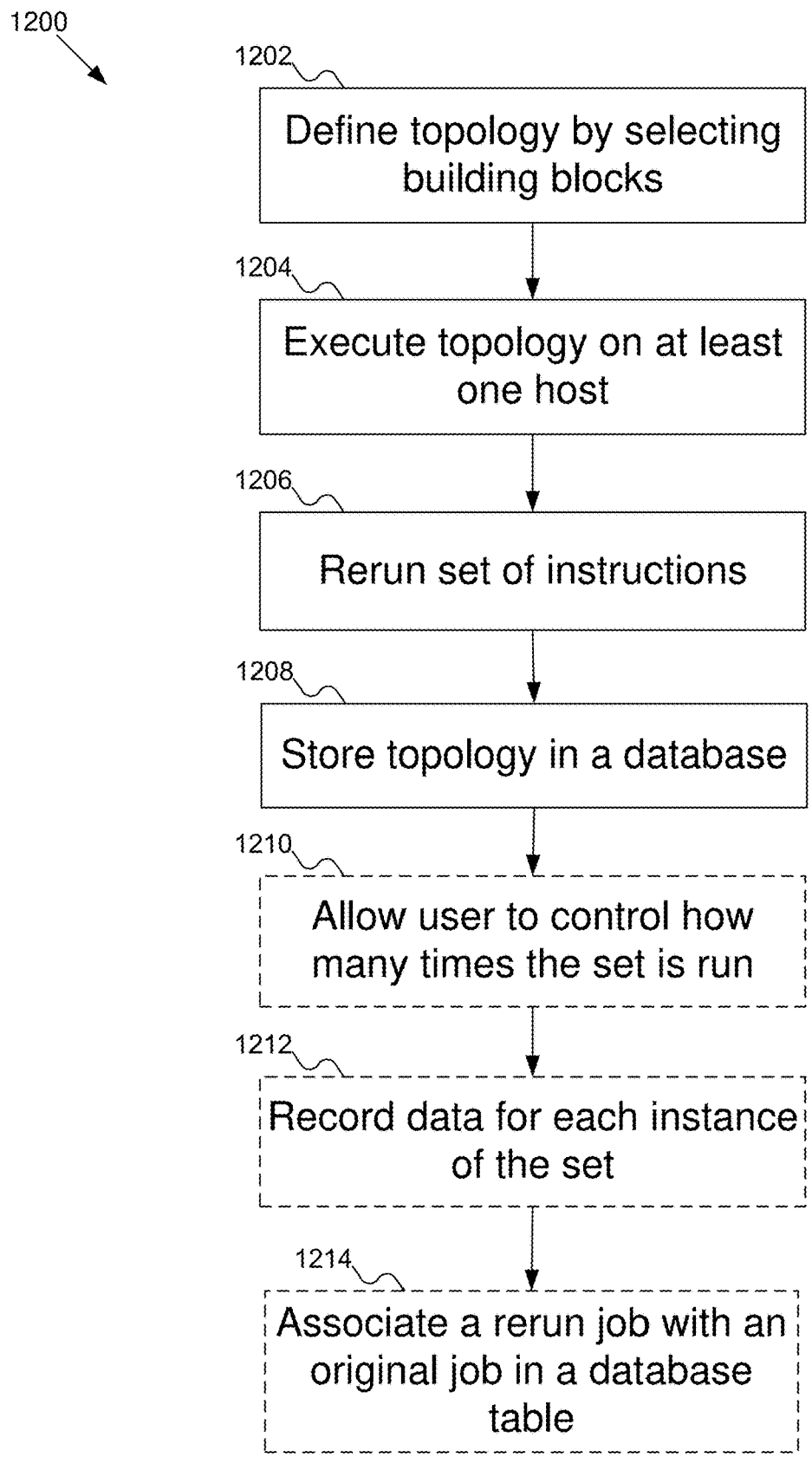
FIG. 12 illustrates an example of a method of rerunning at least one task in accordance with certain implementations of the disclosed technology.

FIG. 12 illustrates an example of a method 1200 of rerunning a set of instructions in accordance with implementations of the disclosed technology. At 1202, a topology is defined, e.g., by way of the selecting of a plurality of building blocks. Each building block generally includes at least one task, e.g., a set of instructions, pertaining to a particular application, for example. At 1204, the topology is executed on at least one host. This may be done, for example, by the executing of the plurality of building blocks on the host(s).

At 1206, the at least one task is rerun. This may be responsive to at least one criteria being met, such as the at least one task experiencing a specific failure, the at least one task experiencing a "new" failure, or a number of failures of the at least one task exceeding a certain threshold, for example.

At 1208, the topology is stored, e.g., by a topology database.

In certain embodiments, a user may be allowed to control how many times the at least one task is rerun, as shown at 1210. Alternatively or in addition thereto, data may be recorded for each instance of the task(s), as indicated by 1212. Alternatively or in addition thereto, the method 1200 may include associating a rerun job with an original job, e.g., in a corresponding database table.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A distributed topology system, comprising:
   a distributed topology engine (DTE) configured to run on a server device and define a topology comprising a plurality of building blocks, each building block representing at least one task pertaining to an application;
   a distributed topology application configured to run on a client device and automatically execute at least one of the plurality of building blocks;
   a distributed topology database configured to store the topology; and
   a job rescheduling module configured to rerun the at least one task within the topology responsive to at least one criteria specified in job parameters stored in the distributed topology database being met by fetching all of the job parameters specified in the first run of the at least one task including hardware criteria, removing certain job parameters for the rerun, and triggering the rerun on new resources matching the hardware criteria of the first run, wherein the at least one criteria includes a number of failures of the at least one task exceeding a certain threshold.

2. The distributed topology system of claim 1, wherein the at least one criteria includes the at least one task experiencing a specific type of failure.

3. The distributed topology system of claim 1, wherein the at least one criteria includes the at least one task experiencing a "new" failure that is distinct from predefined known failures.

4. The distributed topology system of claim 1, wherein the job rescheduling module is further configured to allow a user to control a number of times the at least one task is run and rerun with certain job parameters removed therefrom.

5. The distributed topology system of claim 1, wherein the job rescheduling module is further configured to record data for each instance of the at least one task.

6. The distributed topology system of claim 5, wherein the job rescheduling module is further configured to allow a user to compare tasks, identify intermittent failures, or both based at least in part on the recorded data.

7. A computer-implemented method, comprising:
defining a topology by selecting a plurality of building blocks, each building block representing at least one task pertaining to an application;
executing the topology on a client device by executing the plurality of building blocks on the client device;
rerunning the at least one task responsive to at least one criteria specified in job parameters being met, wherein the at least one criteria includes a number of failures of the at least one task exceeding a certain threshold, and wherein the rerunning includes:
fetching all of the job parameters specified in the first run of the at least one task including hardware criteria;
removing certain job parameters for the rerun; and
triggering the rerun on new resources matching the hardware criteria of the first run; and
storing the topology in a database, wherein the job parameters are stored in the database.

8. The computer-implemented method of claim 7, wherein the at least one criteria includes the at least one task experiencing a specific type of failure.

9. The computer-implemented method of claim 7, wherein the at least one criteria includes the at least one task experiencing a "new" failure that is distinct from predefined known failures.

10. The computer-implemented method of claim 7, further comprising allowing a user to control a number of times the at least one task is run and rerun with certain job parameters removed therefrom.

11. The computer-implemented method of claim 7, further comprising recording data for each instance of the task.

12. The computer-implemented method of claim 11, further comprising allowing a user to compare tasks, identify intermittent failures, or both based at least in part on the recorded data.

13. The computer-implemented method of claim 7, further comprising associating a rerun job with an original job in a database table.

14. One or more non-transitory computer-readable media storing instructions that, when executed by a processor, cause the processor to perform a method comprising:
defining a topology by selecting a plurality of building blocks, each building block representing at least one task pertaining to an application;
certifying at least one of the plurality of building blocks;
executing the topology on at least one host by executing the plurality of building blocks on at least one host; and
rerunning the set of instructions responsive to at least one criteria specified in job parameters stored in a database being met, wherein the at least one criteria includes a number of failures of the at least one task exceeding a certain threshold, and wherein the rerunning includes:
fetching all of the job parameters specified in the first run of the at least one task including hardware criteria;
removing certain job parameters for the rerun; and
triggering the rerun on new resources matching the hardware criteria of the first run.

15. The one or more non-transitory computer-readable media of claim 14, wherein the at least one criteria includes the at least one task experiencing a specific type of failure.

16. The one or more non-transitory computer-readable media of claim 14, wherein the at least one criteria includes the at least one task experiencing a "new" failure that is distinct from predefined known failures.

17. The one or more non-transitory computer-readable media of claim 14, the method further comprising recording data for each instance of the at least one task.

18. The one or more non-transitory computer-readable media of claim 17, the method further comprising associating a rerun job with an original job in a database table.

* * * * *